United States Patent
Chiu et al.

(10) Patent No.: US 10,173,322 B2
(45) Date of Patent: Jan. 8, 2019

(54) MULTI-AXIS ROBOTIC ARM AND ADJUSTING METHOD THEREOF

(71) Applicant: INSTITUTE FOR INFORMATION INDUSTRY, Taipei (TW)

(72) Inventors: Hung-Sheng Chiu, Taipei (TW); Hsiao-Yu Wang, Changhua County (TW); Hung-An Kao, Taipei (TW); Hsing-Hsuan Yang, Taichung (TW); Hsiao-Chen Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 67 days.

(21) Appl. No.: 15/588,715

(22) Filed: May 8, 2017

(65) Prior Publication Data
US 2018/0154516 A1    Jun. 7, 2018

(30) Foreign Application Priority Data
Dec. 6, 2016 (TW) .............................. 105140282 A

(51) Int. Cl.
*B25J 9/12* (2006.01)
*B25J 9/16* (2006.01)
*G05B 19/40* (2006.01)
*H02P 8/22* (2006.01)

(52) U.S. Cl.
CPC ........... *B25J 9/1674* (2013.01); *G05B 19/40* (2013.01); *H02P 8/22* (2013.01); *Y10S 901/23* (2013.01)

(58) Field of Classification Search
CPC .......... G05B 19/40; H02P 8/22; B25J 9/1674
USPC ............ 318/560, 568.11, 568.12, 568.2, 616
See application file for complete search history.

(56) References Cited

U.S. PATENT DOCUMENTS

| | | | |
|---|---|---|---|
| 2004/0176875 A1* | 9/2004 | Iribe | B62D 57/032 700/245 |
| 2007/0290633 A1* | 12/2007 | Atarashi | B60L 3/0023 318/66 |
| 2012/0010748 A1* | 1/2012 | Sasai | B25J 9/1674 700/254 |
| 2017/0007336 A1* | 1/2017 | Tsuboi | B25J 9/1674 |

FOREIGN PATENT DOCUMENTS

CN          105468910 A     4/2016

* cited by examiner

*Primary Examiner* — Jorge L Carrasquillo
(74) *Attorney, Agent, or Firm* — CKC & Partners Co., Ltd.

(57) ABSTRACT

An adjusting method is implemented by a control system and is used to adjust a multi-axis robotic arm including a plurality of motors. The adjusting method includes following operations. A decay rate of each motor is analyzed by the control system. When the decay rate of one of the motors exceeds a corresponding first threshold, a residual value of the one of the motors is further analyzed by the control system. When the residual value exceeds a first default value, an output capacity of at least one of the motors is adjusted by the control system.

8 Claims, 3 Drawing Sheets

MULTI-AXIS ROBOTIC ARM AND ADJUSTING METHOD THEREOF

RELATED APPLICATIONS

This application claims priority to Taiwan Application Serial Number 105140282, filed Dec. 6, 2016, which is herein incorporated by reference.

BACKGROUND

Technical Field

The present disclosure relates to a multi-axis robotic arm. More particularly, the present disclosure relates to a multi-axis robotic arm and an adjusting method which can slow down capacity decay.

Description of Related Art

A multi-axis robotic arm plays an important role in modern automation production technology, in which the multi-axis robotic arm achieves various operations with driving motors built in its joints, which replaces manpower to execute various accurate or dangerous missions. Applications of the multi-axis robotic arm exist in car manufacturing, electronics industry, or even medical assistance, etc.

In the past, when inner components (e.g., motors) of the multi-axis robotic arm decay, the multi-axis robotic arm has to be shut down for maintenance or replacing the motors. Since decay of components are different according to different cases or quality differences, it requires frequently shutting down the multi-axis robotic arm to replace the components, which results in productivity decreasing seriously.

SUMMARY

To solve the above-mentioned problem about frequent shutdown which results in productivity decreasing, one aspect of the present disclosure is an adjusting method. The adjusting method is operated by a control system, used to adjust a multi-axis robotic arm. The multi-axis robotic arm comprises a plurality of motors. The adjusting method comprises: (A) analyzing a decay rate of each of the motors by the control system; (B) when the decay rate of one of the motors exceeds a corresponding first threshold, further analyzing a residual value of the one of the motors by the control system; and (C) when the residual value exceeds a first default value, adjusting an output capacity of at least one of the motors by the control system.

In addition, another aspect of the present disclosure is a multi-axis robotic arm. The multi-axis robotic arm comprises a plurality of motors and a control system. The motors are respectively disposed at a plurality of joints of the multi-axis robotic arm. The control system is configured to analyze a decay rate of each of the motors. When the control system determines that the decay rate of one of the motors exceeds a corresponding first threshold, the control system further analyzes a residual value of the one of the motors. When the residual value exceeds a first default value, the control system adjusts an output capacity of at least one of the motors.

With the multi-axis robotic arm and the adjusting method of the present disclosure, when part of components of the multi-axis robotic arm decay, there is no necessary to shut down the multi-axis robotic arm to replace the components at the first timing. The performance of the multi-axis robotic arm can be compensated with changing other components' operation to maintain productivity, which minimizes the loss when the multi-axis robotic arm being shut down and extends the life of each component, minimizing the cost of replacing components.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention.

Moreover, terms of "comprise", "include", "have", etc. are open transitional phrases meaning "include but not limited to". In addition, the usage "and/or" in the specification includes any one of the listed items or a combination of the items.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
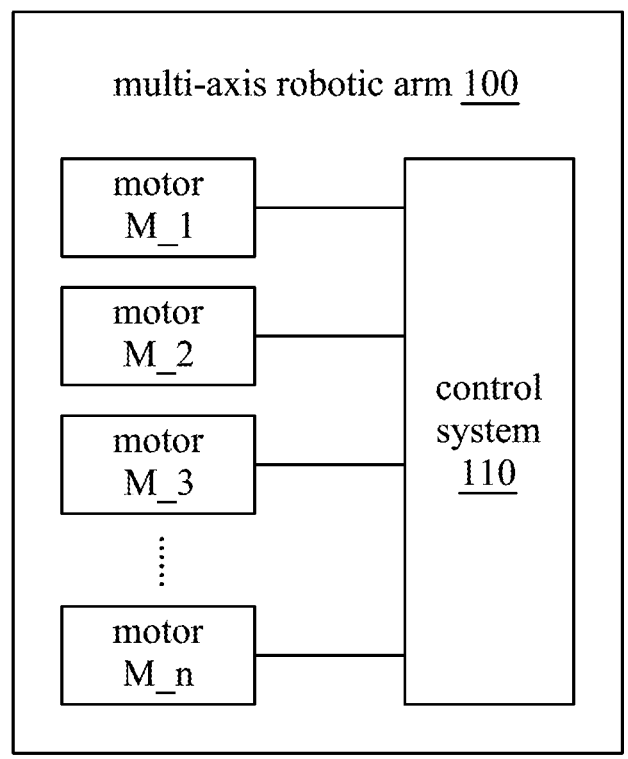
FIG. 1 is an architecture diagram of a multi-axis robotic arm according to an embodiment of this disclosure.

Reference is made to FIG. 1. FIG. 1 depicts an architecture diagram of a multi-axis robotic arm 100 according to one embodiment of the present disclosure. The multi-axis robotic arm 100 includes a plurality of motors $M\_1$-$M\_n$ and a control system 110, in which n is an integer. The amount of the motors of the multi-axis robotic arm 100 can be modified according to practical application. Preferably, the multi-axis robotic arm 100 includes four or more motors.

The motors $M\_1$-$M\_n$ are respectively disposed at n joints of the multi-axis robotic arm 100 and used to control rotation and extension of the multi-axis robotic arm 100, such that the multi-axis robotic arm 100 can operate along a specific path or extend to a specified location for next operation. The motors $M\_1$-$M\_n$ are respectively in charge of rotation and extension of the multi-axis robotic arm 100 in any angle between the horizontal direction and the vertical direction according to practical application.

For example, if the motor M1 is in charge of the rotation in the horizontal direction, when the motor M1 rotates, the multi-axis robotic arm 100 will rotate or extend along the horizontal direction. If the motor M2 is in charge of the rotation in the vertical direction, when the motor M2 rotates, the multi-axis robotic arm 100 will rotate or extend along the vertical direction, and so on and so forth. An extent of rotation or extension of the multi-axis robotic arm 100 is related to an output capacity of each of the motors $M\_1$-

M_n. For example, when the motor M1 is in charge of the rotation in the horizontal direction, if the output (e.g., torque) of the motor M1 is bigger, the extent of rotation or extension of the multi-axis robotic arm 100 in horizontal is bigger.

The control system 110 may be an embedded system or a computer processor which is respectively connected to the motors M_1-M_n and used to instruct for controlling an operation of each of the motors M_1-M_n. Controlling the operation of each of the motors M_1-M_n may be, for example, controlling the output capacity or extent of rotation of each of the motors M_1-M_n. When a user inputs an instruction into the control system 110, the control system 110 can compute an optimal operation instruction for the multi-axis robotic arm 100 to accomplish a specified operation or achieve a specific location according to the instruction of the user. Specifically, the control system 110 can compute the output torque or the extent of rotation needed by each of the motors M_1-M_n for the multi-axis robotic arm 100 to accomplish the specified operation or achieve the specific location with an optimal efficiency or minimal power consumption.

After the control system 110 computes the optimal operation instruction, the control system 110 can determine whether a performance of each of the motors M_1-M_n decays with a built-in prognostics and health management (PHM) to further determine if there is a need of adjustment of the output capacity of each of the motors M_1-M_n or a need of replacing components such as the motors M_1-M_n. The performance of decay can be determined according to a torque variation, a vibration frequency and/or an operating temperature (a rotor temperature, a stator temperature and a components temperature) of the motors. For example, when the torque of the motor is smaller than usual, the vibration frequency of the motor is abnormal or the operation temperature of the motor is high, it can be inferred that the motor decays.

Figure 2:
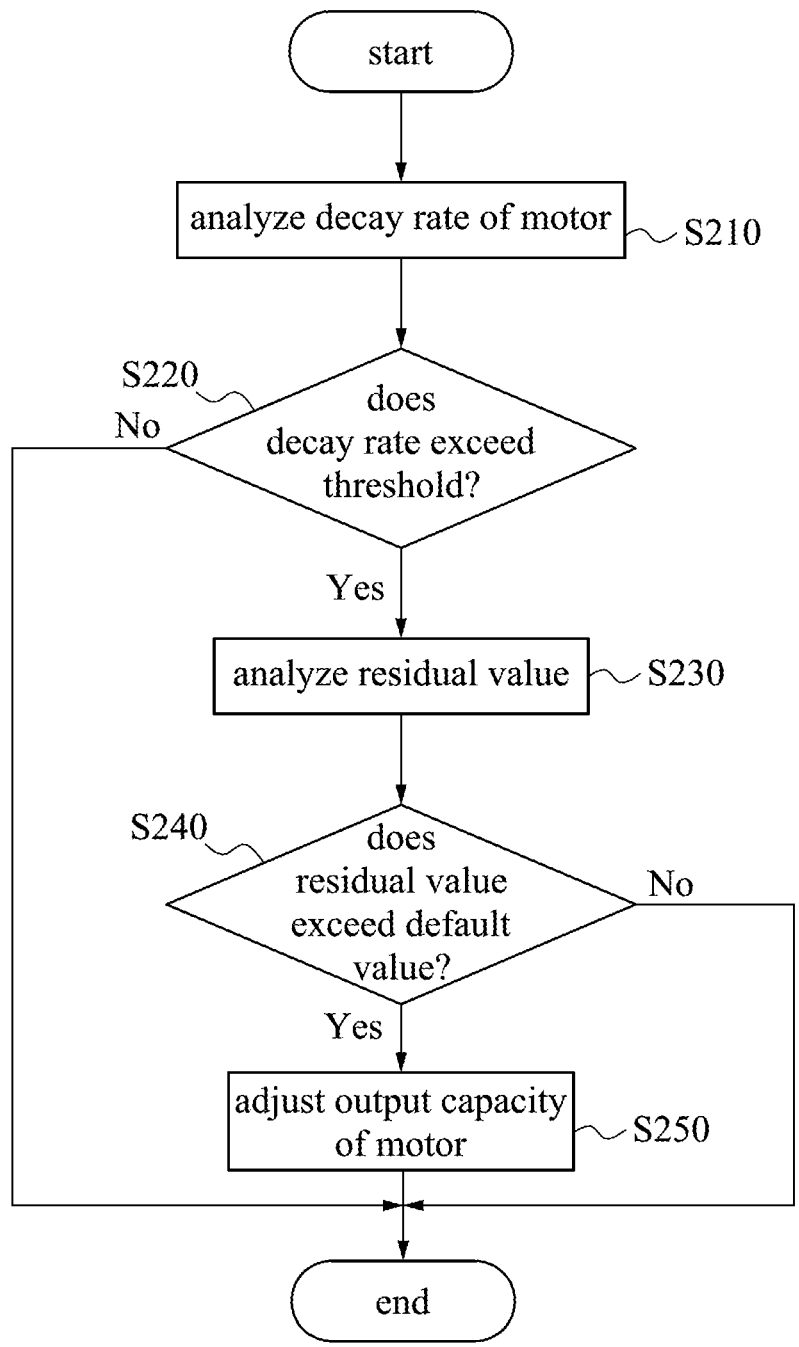
FIG. 2 is a flow chart of an adjusting method according to an embodiment of this disclosure.

Regarding to a mechanism of determining whether to adjust the output capacity of each of the motors M_1-M_n or replacing components, please refer to FIG. 2. FIG. 2 depicts a flow chart of an adjusting method 200 according to one embodiment of the present disclosure. The adjusting method 200 is used to adjust the multi-axis robotic arm 100. The adjusting method 200 includes steps S210, 220, S230, S240 and S250.

In step S210, the control system 110 analyzes a decay rate/extent of each of the motors M_1-M_n. The decay rate can be converted into a value according to any rules. In one embodiment, the decay rate can be a ratio of years of service to an estimated operating life of the motor. In another embodiment, the decay rate can be a ratio of a current maximal torque to an initial maximal torque of the motor. That is, the decay rate can be judged according to a practical applied field of the multi-axis robotic arm 100, and the present disclosure is not limited thereto.

In step S220, if the decay rate of one of the motors M_1-M_n (e.g., M_1) exceeds a corresponding first threshold, the method 200 is directed to step S230. The abovementioned corresponding first threshold of each motor can be an identical value (e.g., 80%) for every motor, or, every motor can correspond to different first thresholds.

In step S230, the adjusting method 200 further analyzes a residual value of the motor (e.g., M_1) with the decay rate exceeding the corresponding first threshold. The residual value means a remaining price of a machine or components, and the residual value is estimated when the machine or components are no longer usable. Specifically, a proportion of a current estimated residual life (the estimated operating life minus current years of service) in the whole estimated operating life of a component multiplies a purchase price of the component is the residual value of the component.

Next, in step S240, determining whether the residual value of the motor (e.g., M_1) analyzed in step S230 exceeds a first default value. When in step S240 the residual value of the motor exceeds the first default value is determined, it is inferred that the motor still has a longer operating life and a cost of replacing components is higher. Therefore, the method 200 moves to step S250 to adjust the output capacity of at least one of the motors M_1-M_n. The aforementioned first default value can be set according to practical application and is not limited thereto.

Specifically, step S250 can adjust each operating parameter of the motor with the decay rate exceeding the corresponding first threshold, such that the control system 110 can re-compute the optimal operation instruction of each motor according to adjusted parameters. Preferably, the control system 110 decreases the output torque of the motor with the decay rate exceeding the corresponding first threshold according to the adjusted operation parameters and increases the output torque of another motor to compensate a whole output capacity of the multi-axis robotic arm 100.

For example, presuming that the multi-axis robotic arm 100 is a four-axis robotic arm which only has four motors M_1-M_4 and that an initial position of an endpoint of the multi-axis robotic arm 100 locates at point A1. If a user requires the endpoint of the multi-axis robotic arm 100 to extend to a target location from the initial location, a variation of location in a coordinate system and a needed output torque of each of the motors M_1-M_4 are shown in Table 1 below:

TABLE 1

| motor | Initial coordinate | Target coordinate | Output torque (kg-m) |
|---|---|---|---|
| M_1 | $(X_{A1}, Y_{A1}, Z_{A1})$ | $(X_{B1}, Y_{B1}, Z_{B1})$ | $T_1$ |
| M_2 | $(X_{A2}, Y_{A2}, Z_{A2})$ | $(X_{B2}, Y_{B2}, Z_{B2})$ | $T_2$ |
| M_3 | $(X_{A3}, Y_{A3}, Z_{A3})$ | $(X_{B3}, Y_{B3}, Z_{B3})$ | $T_3$ |
| M_4 | $(X_{A4}, Y_{A4}, Z_{A4})$ | $(X_{B4}, Y_{B4}, Z_{B4})$ | $T_4$ |

In Table 1, the initial coordinate is a corresponding coordinate of each motor when the endpoint of the multi-axis robotic arm 100 locates at the initial location. The target coordinate is a corresponding coordinate of each motor when the endpoint of the multi-axis robotic arm 100 locates at the target location. That is, only when each of the motors M_1-M_4 locates at each target coordinate will the endpoint of the multi-axis robotic arm 100 locate at the target location. In addition, presuming that the output torque $T_1$ is 0.56, $T_2$ is 0.8, $T_3$ is 0.9 and $T_4$ is 0.8.

Generally, if none of motors decay (healthy condition), the motors M_1-M_4 will linearly move to each target coordinate form each initial coordinate, such that the multi-axis robotic arm 100 can extend to the target location with linear (shortest) path. However, when a motor decays, the needed torque of the motor along the original moving path burdens the motor. If insisting on moving with the original moving path and with the original torque, the consumption of the motor is accelerated.

Accordingly, presuming that the motor M_1 decays and its decay rate exceeds the corresponding first threshold and then after adjusting the output capacity of each of the motors in step S250, the variation of coordinate and the needed torque of each of the motors M_1-M_4 are shown in Table 2 below:

TABLE 2

| motor | Initial coordinate | Relay coordinate | Target coordinate | Output torque (kg-m) |
|---|---|---|---|---|
| M_1 | $(X_{A1}, Y_{A1}, Z_{A1})$ | $(X_{C1}, Y_{C1}, Z_{C1})$ | $(X_{B1}, Y_{B1}, Z_{B1})$ | $V_1$ |
| M_2 | $(X_{A2}, Y_{A2}, Z_{A2})$ | $(X_{C2}, Y_{C2}, Z_{C2})$ | $(X_{B2}, Y_{B2}, Z_{B2})$ | $V_2$ |
| M_3 | $(X_{A3}, Y_{A3}, Z_{A3})$ | $(X_{C3}, Y_{C3}, Z_{C3})$ | $(X_{B3}, Y_{B3}, Z_{B3})$ | $V_3$ |
| M_4 | $(X_{A4}, Y_{A4}, Z_{A4})$ | $(X_{C4}, Y_{C4}, Z_{C4})$ | $(X_{B4}, Y_{B4}, Z_{B4})$ | $V_4$ |

In this embodiment, for example, decreasing the output torque $T_1$ (0.56) of the motor M_1 which has higher decay rate to $V_1$ (0.3) in step S250. A decreasing extent of the output torque can be modified according to practical application. The output torque of each of the motor M_2-M_4 will be modified to compensate the output torque $V_1$ of the motor M_1, in which the output torque of the motor M_2 is modified from $T_2$ (0.8) to $V_2$ (0.6), the output torque of the motor M_3 is modified from $T_3$ (0.9) to $V_3$ (1.3), and the output torque of the motor M_4 is modified from $T_4$ (0.8) to $V_4$ (1.2), such that the endpoint of the multi-axis robotic arm 100 can achieve the target location at final.

Because the output torque changes, each of the motors M_1-M_4 cannot linearly move to the target coordinate with the original path. Accordingly, each of the motors M_1-M_4 moves to a relay coordinate and then moves to the target coordinate from the relay coordinate. In this way, since the output torque of the motor M_1 decreases, the consumption slows down, such that in a condition of not replacing motor(s), the whole operating life of the multi-axis robotic arm 100 is extended. It should be noted that the relay coordinate can be plural positions and that the above text is just an example and is not used to limit the present invention.

Figure 3:
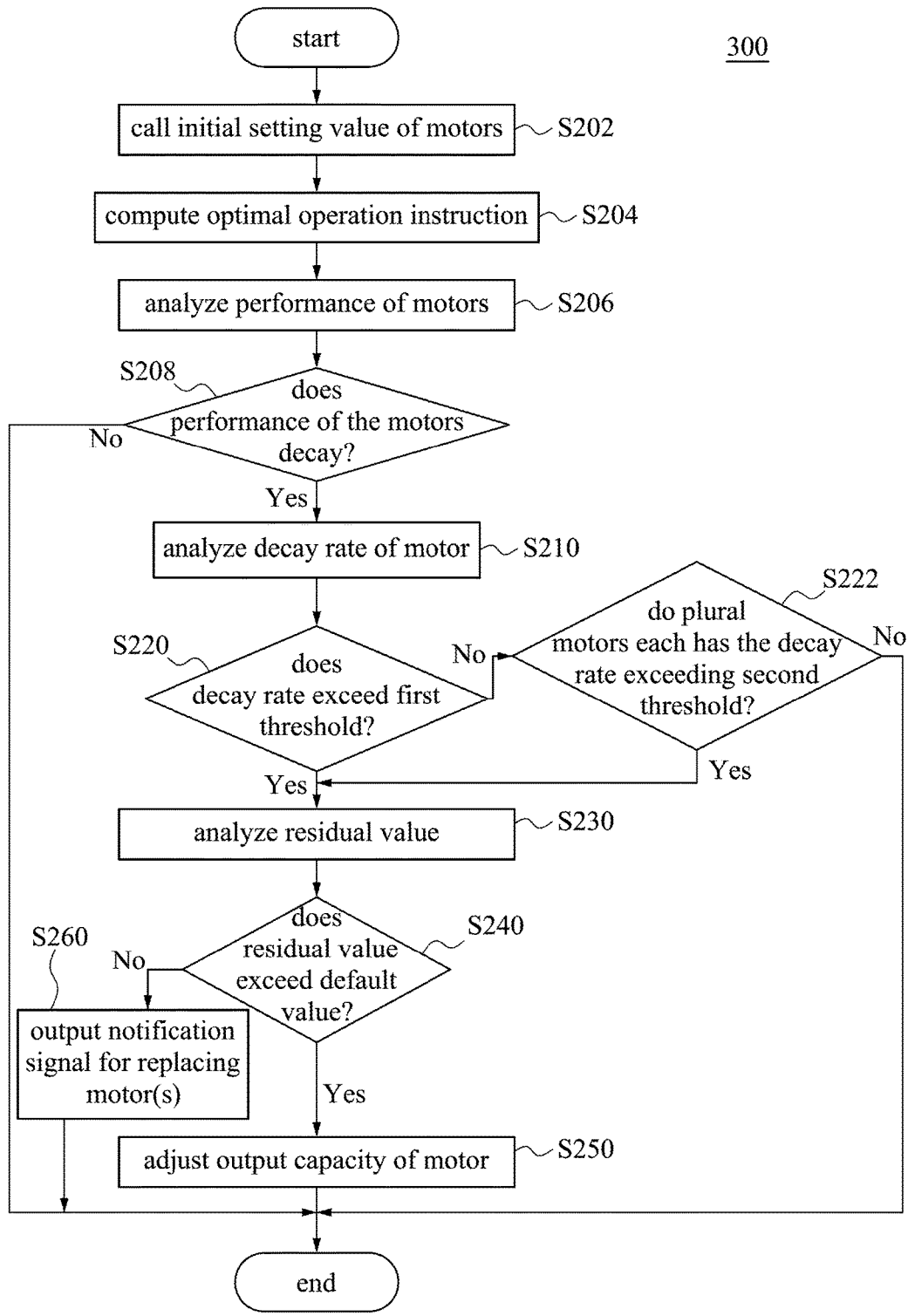
FIG. 3 is a flow chart of an adjusting method according to an embodiment of this disclosure.

Further detailed adjusting method is referred to a flow chart of an adjusting method 300 depicted in FIG. 3 according to one embodiment of the present disclosure. The adjusting method 300 is also used to adjust the multi-axis robotic arm 100. The adjusting method 300 includes steps S202, S204, S210, S212, S220, S222, S230, S240, S250 and S260. First, when a user inputs an instruction into the control system 110 of the multi-axis robotic arm 100, the control system 110 calls and analyze each initial setting value of the motors M_1-M_n in step S202. The initial setting value may be an original range of the output capacity and various operating parameters (temperature, friction, joint positions, etc.) of each of the motors M_1-M_n.

In step S204, computing the optimal operation instruction according to the analysis in step S202, such as how the motors M_1-M_n operate for the multi-axis robotic arm 100 to achieve instructed operation with minimal power consumption and/or optimal efficiency. After computing the optimal operation instruction, the control system 110 uses the prognostics and health management (PHM) to analyze a performance of each of the motors M_1-M_n according to at least one of the torque, the vibration, the operating temperature of each of the motors M_1-M_n in step S206.

Next, in step S208, determining whether the performance of the motors M_1-M_n decays. If the performance of motors M_1-M_n does not decay, it means that the multi-axis robotic arm 100 functions well and can start a mission instructed by the user according to the optimal operation instruction generated in step S204. If the capacity of the motors M_1-M_n decays, the method 300 is directed to step S210 to analyzing the decay rate/degree of each of the motors M_1-M_n.

In step S220, when the decay rate of one of the motors M_1-M_n (e.g., the motor M_1) exceeds the corresponding first threshold, the adjusting method 300 moves to step S230. Like the adjusting method 200, the corresponding first threshold of each motor in the adjusting method 300 can be an identical value (e.g., 80%), or, every motor can correspond to different first thresholds.

In step S230, the adjusting method 300 further analyzes a residual value of the motor (e.g., the motor M_1) with the decay rate exceeding the corresponding first threshold. Next, in step S240, determining whether the residual value of the motor exceeds the first default value. If in step S240 the residual value exceeding the first default value is determined, then adjusting the output capacity of at least one of the motors M_1-M_n in step S250. The aforementioned first default value can be set according to practical application and is not limited thereto.

As described above, if in step S240 the residual value less than the first default value is determined, outputting a notification signal by the control system 110 in step S260 to inform a user to replace the components. Specifically, the components about to be replaced may be at least one of the motors M_1-M_n or at least one of reducers (not shown) respectively corresponding to each of the motors M_1-M_n which are used to assist the motors to adjust torque or accelerate/slow down. In one embodiment, one can replace the motors with the decay rate exceeding the corresponding first threshold and/or the corresponding reducers, or, one can replace all the motors and/or all the reducers.

As the embodiment above, if in step S220 the decay rate of the one of the motors less than the corresponding first threshold is determined, detecting whether there are K motors each having the decay rate exceeding a corresponding second threshold in step S222, in which K is an integer greater than 1. Preferably, K is n/2, i.e., half amount of the motors. In addition, the corresponding second threshold of each of the motors M_1-M_n is less than the corresponding first threshold. The corresponding second threshold of each motor can be identical value (e.g., 50%), or, every motor can correspond to different second threshold.

For example, when an amount of the motors each having the decay rate exceeding the corresponding second threshold is less than K (e.g., half amount of the motors M_1-M_n), it can be inferred that the multi-axis robotic arm 100 is still healthy and can start executing a mission with the optimal operation instruction computed in step S204.

When there are more than K (e.g., half amount of the motors M_1-M_n) motors each having the decay rate exceeding the corresponding second threshold, it can be inferred that a whole decay rate of the multi-axis robotic arm 100 is higher, the adjusting method 300 is directed to step S230 to analyze an average residual value of the motors each having the decay rate exceeding the corresponding second threshold. Then the adjusting method 300 moves to step S240 to determine whether the average residual value exceeds a second default value. The second default value can be the same as the first default value or different from the first default value according to practical application.

When in step S240 the average residual value exceeding the second default value exceeding the second default value is determined, adjusting the output capacity of at least one of the motors M_1-M_n in step S250. In this example, the adjusting method 300 can decrease the output torque of the motors each having the decay rate exceeding the corresponding second threshold and control the motors each having the decay rate less than the corresponding second threshold to compensate. When in step S240 the average residual value is less than the second default value is determined, outputting a notification signal by the control system 110 in step S260 to inform a user to replace at least one of the motors M_1-M_n and/or at least one of the reducers corresponding to the motors M_1-M_n. Because there are more than half amount of the motors each having the decay rate exceeding the corresponding second threshold in the motors M_1-M_n, it is preferable to replace all the motor and/or all the reducers.

In another embodiment of the present disclosure, the determining basis used in steps S230-S240 of the adjusting method 200 and the adjusting method 300 can be referred to a production capacity (productivity) of the multi-axis robotic arm 100. The production capacity represents the price of production or the output amount provided by the multi-axis robotic arm 100 when the multi-axis robotic arm 100 is operating. For example, in step S230 of the adjusting method 200 and/or the adjusting method 300, analyzing the production capacity of the multi-axis robotic arm 100. Then in step S240, determining a level of the production capacity. When the multi-axis robotic arm 100 has the production capacity of a high level, adjusting the output capacity of the motor(s) in step S250 for continuing executing missions, otherwise, outputting the notification signal in step S260 for replacing the motor(s).

In one embodiment of the present disclosure, the determining basis in steps S230-S240 of the adjusting method 200 and the adjusting method 300 can be referred to a downtime cost. The downtime cost represents a production reduction caused when shutting down a machine for replacing components. For example, in the adjusting method 200 and/or the adjusting method 300 in step S230, analyzing the downtime cost of the multi-axis robotic arm 100. Then in step S240, determining a level of the downtime cost. When the downtime cost is at a high level, it can be inferred that the production reduction is higher and the multi-axis robotic arm should not be shut down for replacing components. Accordingly, adjusting the output capacity of the motor(s) in step S250 to continue executing missions. Otherwise, when the downtime cost is at a low level, it can be inferred that the production reduction is less and that the decay degree of the motor(s) is more serious which causes the production reduction is low. Accordingly, the multi-axis robotic arm should be shut down for replacing components, so outputting the notification in step S260 for replacing the motor(s).

With the teaching of the present disclosure, there is no need to frequently replace the motor(s) of the multi-axis robotic arm. In addition, an operating accuracy and a whole capacity can be maintained, which reduces the loss of a production line caused by frequently replacing components. Moreover, because each motor can compensate for each other, a consumption of a decaying motor can be significantly reduced and an operating life of the multi-axis robotic arm is extended, which further reduces the cost of components used for replacing.

What is claimed is:

1. An adjusting method operated by a control system, used to adjust a multi-axis robotic arm, the multi-axis robotic arm comprises a plurality of motors, the adjusting method comprises:
   (A) analyzing a decay rate of each of the motors by the control system;
   (B) when the decay rate of one of the motors exceeds a corresponding first threshold, further analyzing a residual value of the one of the motors by the control system; and
   (C) when the residual value exceeds a first default value, adjusting an output capacity of at least one of the motors by the control system;
   wherein step (B) further comprises:
   when the decay rate of one of the motors is less than the corresponding first threshold, detecting that whether there are plural motors each having the decay rate exceeding a corresponding second threshold by the control system, wherein the corresponding second threshold of each motor is less than the corresponding first threshold of each motor;
   when there are plural motors each having the decay rate exceeding the corresponding second threshold, analyzing an average residual value of the plural motors each having the decay rate exceeding the corresponding second threshold by the control system; and
   when the average residual value exceeds a second default value, adjusting the output capacity of at least one of the motors by the control system;
   wherein step (A) further comprises:
   determining by the control system whether a performance of the motors decays according to one of a torque, a vibration and an operating temperature of the motors, analyzing the decay rate of each of the motors only when determining that the performance of the motors decays.

2. The adjusting method according to claim 1, wherein the step (B) further comprises: analyzing the residual value by the control system according to an estimated residual life of the one of the motors.

3. The adjusting method according to claim 1, further comprises: (D) when the residual value is less than the first default value, outputting a notification signal by the control system for replacing at least one of the motors.

4. The adjusting method according to claim 1, further comprises: (D1) when the average residual value is less than the second default value, outputting a notification signal by the control system for replacing at least one of the motors.

5. The adjusting method according to claim 1, wherein step (C) further comprises: (CI) decreasing an outputting torque of the one of the motors; and (C2) increasing the outputting torque of at least another one of the motors.

6. A multi-axis robotic arm comprising:
   a plurality of motors respectively disposed at a plurality of joints of the multi-axis robotic arm; and
   a control system configured to analyze a decay rate of each of the motors;
   wherein when the control system determines that the decay rate of one of the motors exceeds a corresponding first threshold, the control system further analyzes a residual value of the one of the motors, when the residual value exceeds a first default value, the control system adjusts an output capacity of at least one of the motors;
   wherein when the control system determines that the decay rate of one of the motors is less than the corresponding first threshold, the control system detects that whether there are plural motors each having the decay rate exceeding a corresponding second threshold, wherein the corresponding second threshold of each motor is less than the corresponding first threshold of each motor, when the control system determines that there are plural motors each having the decay rate exceeding the corresponding second threshold, the control system analyzes an average residual value of the plural motors each having the decay rate exceeding the corresponding second threshold, and when the average residual value exceeds a second default value, the control system adjusts the output capacity of at least one of the motors;

wherein before the control system analyzes the decay rate of each of the motors, the control system determines whether a performance of the motors decays according to one of a torque, a vibration and an operating temperature of the motors, and analyzes the decay rate of each of the motors only when determining that the performance of the motors decays.

7. The multi-axis robotic arm according to claim 6, wherein the control system analyzes the residual value according to an estimated residual life of the one of the motors.

8. The multi-axis robotic arm according to claim 6, wherein adjusting the output capacity of at least one of the motors comprises decreasing an outputting torque of the one of the motors, and increasing an outputting torque of at least another one of the motors.

\* \* \* \* \*